(12) United States Patent
Hazama et al.

(10) Patent No.: US 9,004,464 B2
(45) Date of Patent: Apr. 14, 2015

(54) CURVED SPRING AND SLIDE MECHANISM

(75) Inventors: Yuji Hazama, Chiba (JP); Kentaro Nagasawa, Chiba (JP); Toru Hirokane, Chiba (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 122 days.

(21) Appl. No.: 13/813,481

(22) PCT Filed: Aug. 2, 2011

(86) PCT No.: PCT/JP2011/067701
§ 371 (c)(1),
(2), (4) Date: Jan. 31, 2013

(87) PCT Pub. No.: WO2012/018025
PCT Pub. Date: Feb. 9, 2012

(65) Prior Publication Data
US 2013/0125683 A1   May 23, 2013

(30) Foreign Application Priority Data
Aug. 4, 2010   (JP) .................................. 2010-175722

(51) Int. Cl.
*F16F 1/18*   (2006.01)
*F16F 3/02*   (2006.01)
(Continued)

(52) U.S. Cl.
CPC . *F16F 1/18* (2013.01); *F16F 3/023* (2013.01); *G06F 1/1624* (2013.01); *G06F 1/1675* (2013.01); *H04M 1/0235* (2013.01); *H04M 1/0237* (2013.01)

(58) Field of Classification Search
CPC .............. F16F 1/18; F16F 1/185; F16F 1/187
USPC ........... 267/47, 230, 244, 247, 254, 236, 229, 267/154, 158–160, 165, 45, 46, 148
See application file for complete search history.

(56) References Cited

U.S. PATENT DOCUMENTS 106,005 A * 8/1870 Walker ............................ 267/47
1,241,743 A * 10/1917 Landeau ......................... 267/47
(Continued)

FOREIGN PATENT DOCUMENTS

DE   000524152 C * 5/1931
FR   000679034 A * 4/1930
(Continued)

OTHER PUBLICATIONS

Korean Office Action mailed Mar. 6, 2014 with English translation.
(Continued)

*Primary Examiner* — Melanie Torres Williams
(74) *Attorney, Agent, or Firm* — IPUSA, PLLC

(57) ABSTRACT

A curved spring includes one and another end parts configured to approach and separate relative to each other in an approaching/separating direction and plural beam parts that bend between the one end part and the other end part and extend in an extending direction. The plural beam parts are arranged in a width direction orthogonal to the approaching/separating direction. At least one combination of adjacent beam parts among combinations of the plural beam parts includes an outer side beam part having a width greater than a width of an inner side beam part in the width direction. The outer side beam part has a length less than a length of the inner side beam part in the approaching/separating direction. The one and the other end parts and at least one beam part of the plural beam parts are integrally molded on a shared plane by a synthetic resin.

9 Claims, 16 Drawing Sheets

(51) Int. Cl.
*G06F 1/16* (2006.01)
*H04M 1/02* (2006.01)

(56) References Cited

U.S. PATENT DOCUMENTS

| | | | | |
|---|---|---|---|---|
| 2,585,367 | A * | 2/1952 | Brooks et al. | 267/50 |
| 4,269,400 | A * | 5/1981 | Jensen | 267/153 |
| 4,753,772 | A * | 6/1988 | Schmertz | 376/285 |
| 6,460,838 | B1 * | 10/2002 | Bradley et al. | 267/149 |
| 2009/0069058 | A1 | 3/2009 | Taschke | |
| 2010/0214726 | A1 | 8/2010 | Kubota | |
| 2010/0237550 | A1 * | 9/2010 | Kubota | 267/159 |

FOREIGN PATENT DOCUMENTS

| | | | |
|---|---|---|---|
| FR | 000041851 E | * | 1/1933 |
| GB | 191502828 A | * | 2/1916 |
| GB | 1126832 A | * | 9/1968 |
| JP | 2005-090617 | | 4/2005 |
| JP | 2005-291315 | | 10/2005 |
| JP | 2006-112530 | | 4/2006 |
| JP | 2006-300259 | | 11/2006 |
| JP | 2008-312176 | | 12/2008 |
| JP | 2009-177769 | | 8/2009 |
| JP | 2009-538544 | | 11/2009 |
| JP | 3155691 U | | 11/2009 |
| KR | 20-1984-0001168 | | 3/1984 |
| KR | 10-0242067 | | 3/2000 |
| KR | 20-0169117 | | 3/2000 |

OTHER PUBLICATIONS

International Search Report mailed on Nov. 8, 2011.

* cited by examiner

FIG.3

| CHARACTERISTIC | LOAD ADJUSTMENT | STRESS ADJUSTMENT | COUNTERMEASURES FOR SHIFT IN THICKNESS DIRECTION |
|---|---|---|---|
| ADJUSTMENT ITEM | ●ADJUSTMENT OF NUMBER OF BEAM PARTS<br>・NUMBER↑LOAD↑<br>●ADJUSTMENT OF WIDTH OF BEAM PART<br>・WIDTH↑LOAD↑<br>●ADJUSTMENT OF ROOT SHAPE<br>・THICKENING OF ROOT↑LOAD↑<br>●ADJUSTMENT OF THICKNESS<br>・THICKNESS↑LOAD↑<br>●ADJUSTMENT OF LENGTH<br>・LENGTH↓LOAD↑<br>●ADJUSTMENT OF OUTER PERIPHERAL SHAPE<br>・ADDITION OF CUTS TO OUTER PERIPHERY LOAD↓ | ●ADJUSTMENT OF WIDTH OF BEAM PART<br>・WIDTH↓STRESS↓<br>●ADJUSTMENT OF BALANCE OF WIDTH<br>・WIDTH ADJUSTMENT<br>→EQUALIZING OF STRESS<br>●ADJUSTMENT OF LENGTH<br>・LENGTH↑STRESS↓ | ●ADJUSTMENT OF WIDTH OF BEAM PART<br>・WIDTH↓SHIFT↓<br>●ADJUSTMENT OF ROOT SHAPE<br>・THICKENING OF ROOT↑SHIFT↓<br>●ADJUSTMENT OF FASTENING PART<br>・THICKENING OF VICINITY OF FASTENING PART↑SHIFT↓<br>・THICKENING OF VICINITY OF FASTENING PART IN XY DIRECTIONS↑SHIFT↓ |

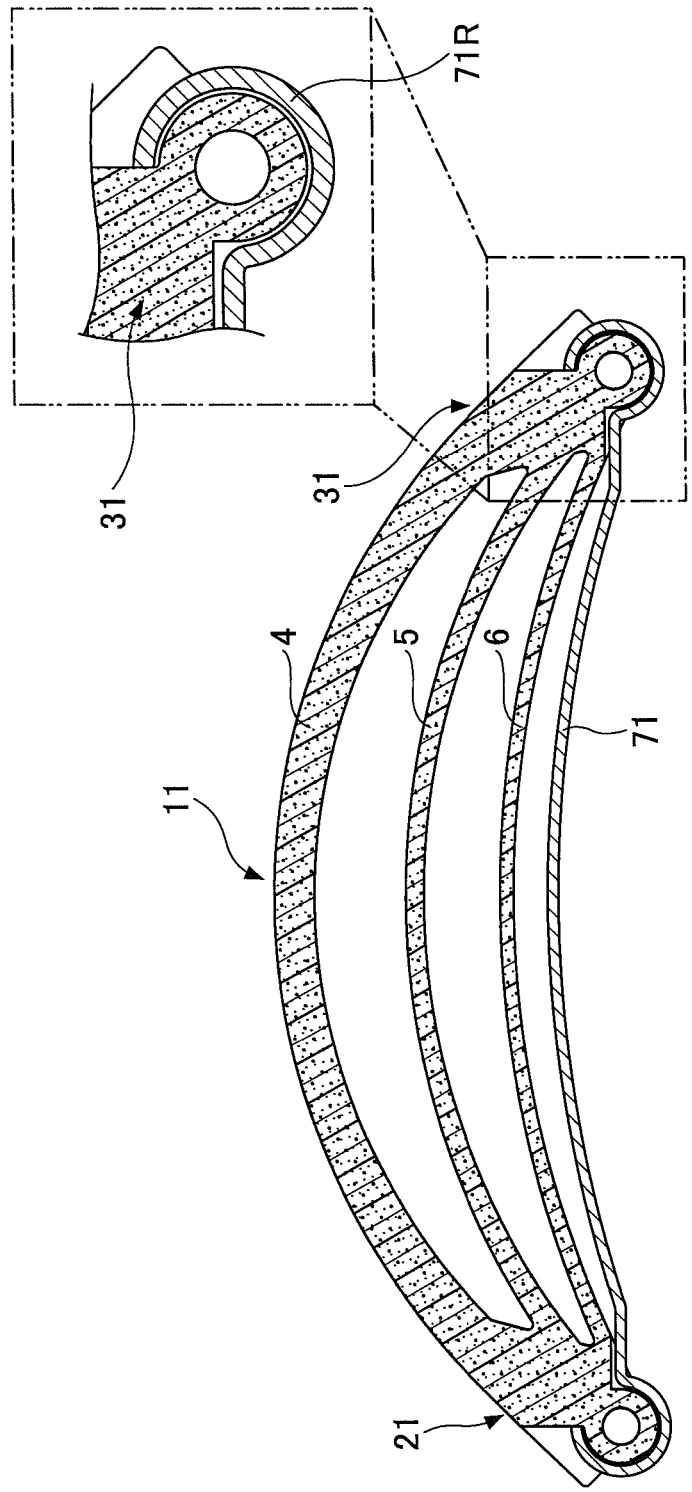

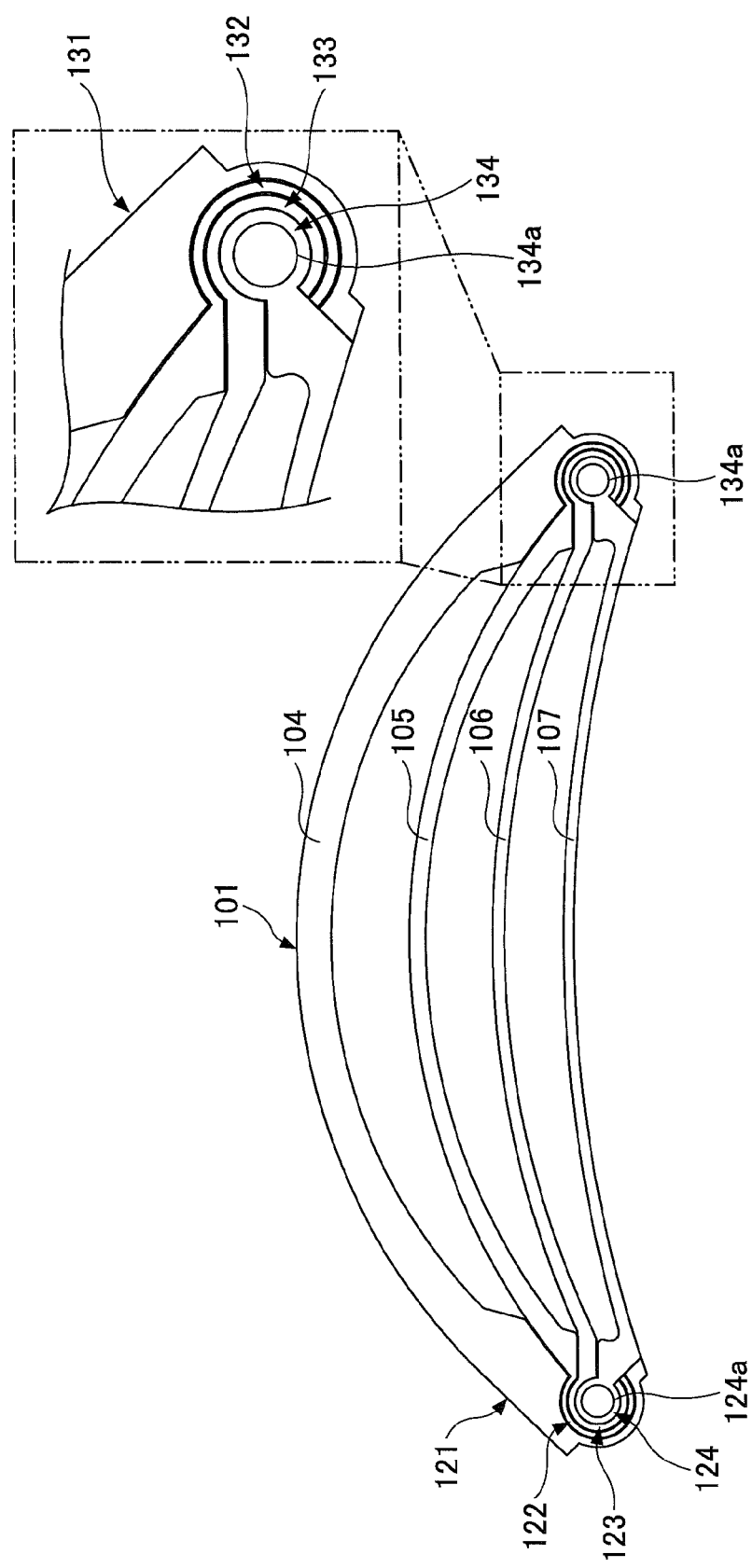

CURVED SPRING AND SLIDE MECHANISM

TECHNICAL FIELD

The present invention relates to a device such as a portable telephone or a portable terminal that includes a main body part and a sub-body part, for example, a slide mechanism having a sub-body part that is slidable relative to a main body part or a curved spring used for the slide mechanism.

BACKGROUND ART

As a known electronic device (e.g., portable telephone), there is one having a main body part including a ten-key, a microphone, and the like, a sub-body part including a liquid crystal display, a speaker, and the like, and a slide mechanism that slides the sub-body part relative to the main body part. With this electronic device, the sub-body part, which is coupled to the main body part by way of the slide mechanism, is slid relative to the main body part. Thereby, the speaker can be positioned toward an ear of the user, the microphone can be positioned toward a mouth or the vicinity of a chin of the user, or the ten-key can be exposed and juxtaposed with a display.

A slide mechanism used for this type of electronic device is disclosed in Patent Document 1. The slide mechanism disclosed in Patent Document I includes a torsion spring having one end rotatably coupled to a main body part and another end rotatably coupled to a sub-body part. An urging force of the torsion spring applies a force reacting against the user's operation during a first half of sliding and applies a force that supports the user's operation during a second half of the sliding.

RELATED ART REFERENCE

Patent Document

Patent Document 1: Japanese Laid-Open Patent Publication No. 2005-291315

DISCLOSURE OF THE INVENTION

Problem to be Solved by Invention

However, with the slide mechanism having such configuration, the dimension of a coil-shaped part of the torsion spring increases in a front/rear direction of the slide mechanism. This leads to a problem of interference with respect to other components inside the electronic device and a problem of low degree of freedom for arrangement. Further, in manufacturing the torsion spring, there is a problem of reduced productivity because a step of winding a linear member into a coil shape is to be included.

Means for Solving Problem

It is a general object of the present invention to provide a curved spring and a slide mechanism that solves the above-described problems of the related art.

A more specific object of the present invention is to provide a curved spring and a slide mechanism that have a high degree of freedom for arrangement inside an electronic device and high productivity.

Further, in order to achieve the above-described object, the present invention provides a curved spring for generating an urging force in a separating direction that separates one end part and another end part from each other in correspondence with displacement between the one end part and the other end part in an approaching/separating direction, the curved spring including plural beam parts that bend between the one end part and the other end part and extend in an extending direction, the plural beam parts being arranged in a width direction orthogonal to the approaching/separating direction, wherein at least one combination of adjacent beam parts among combinations of the plural beam parts includes an outer side beam part having a width that is greater than a width of an inner side beam part in the width direction, wherein the outer side beam part has a length that is less than a length of the inner side beam part in the approaching/separating direction, wherein the one and the other end parts and at least one beam part of the plural beam parts are integrally molded on a shared plane by a synthetic resin.

Further, the slide mechanism of the present invention includes the curved spring, a substrate, and a slide plate that is slidably connected to the substrate in a predetermined direction, wherein the one shaft receiving part of the curved spring is rotatably connected to the substrate, wherein the other shaft receiving part of the curved spring is rotatably connected to the slide plate.

Effect of the Invention

With a curved spring and a slide mechanism of the present invention, the degree of freedom for arrangement inside an electronic device and productivity of the electronic device can be increased.

BRIEF DESCRIPTION OF THE DRAWINGS

FIG. 3 is a schematic diagram illustrating a various parameters for adjustments that contribute to adjustment of load and force of the curved spring of the first embodiment and countermeasures against shifting in a thickness direction;

FIG. 9A is a cross-sectional view of the curved spring of the second embodiment;

FIG. 11 is a plan view of the curved spring of the third embodiment.

Figure 1:
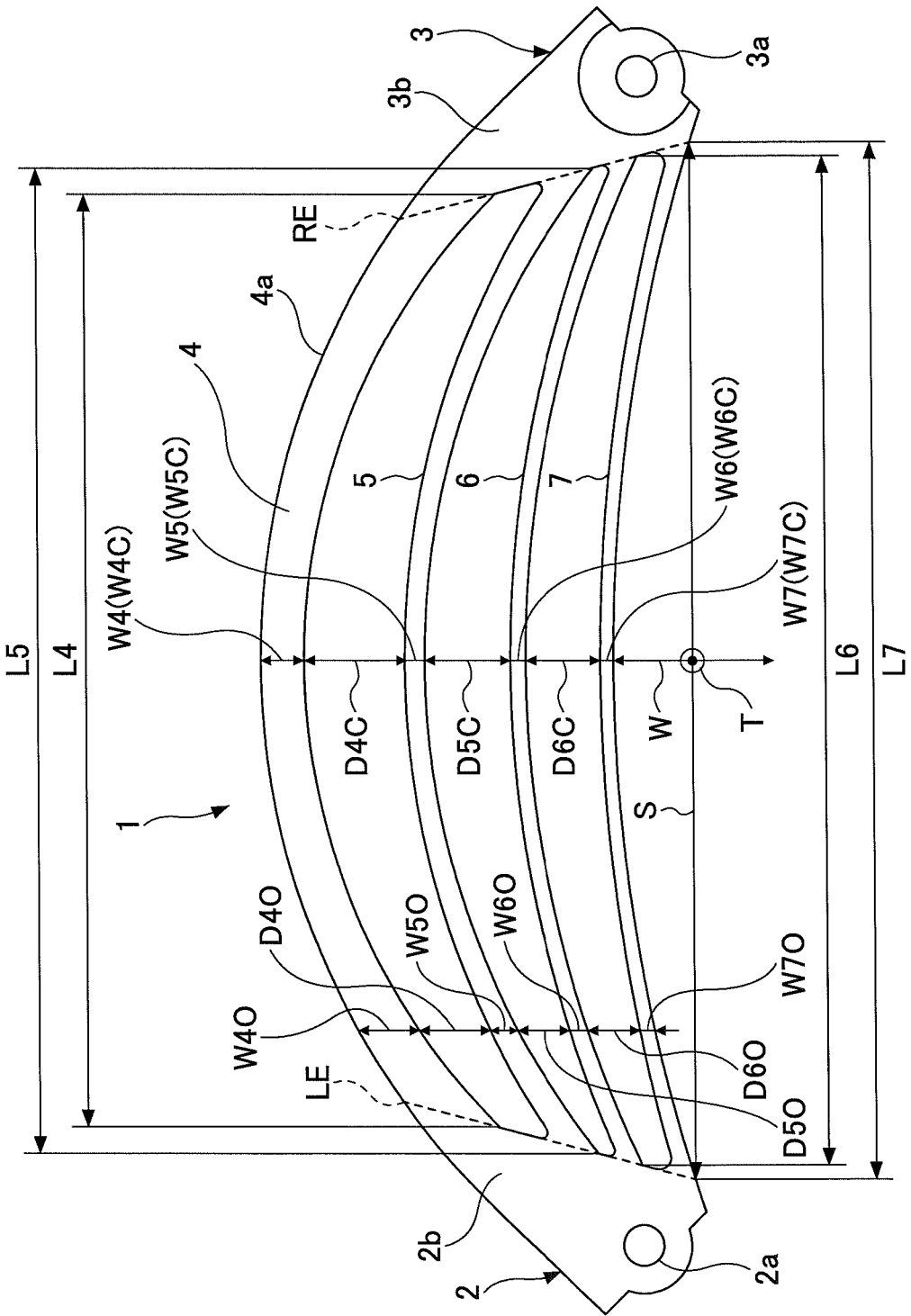
FIG. 1 is a plan view illustrating a curved spring of a first embodiment.

EXPLANATION OF REFERENCE NUMERALS 1 curved spring
2 one end part
2a one shaft receiving part
2b one communication part
3 other end part
3a other shaft receiving part
3b other communication part
4 beam part (outermost curve)
4a adjustment part (cut part)
5-7 beam part
8 base plate (substrate)
9 slide plate
10 pin
11 curved spring
71 beam part (innermost curve)
101 curved spring
121 one independent communication part
122 one independent communication part
123 one independent communication part
124 one independent communication part
124a one shaft receiving part
131 other independent communication part
132 other independent communication part
133 other independent communication part
134 other independent communication part
134a other shaft receiving part
104 beam part
105 beam part
106 beam part
107 beam part

EMBODIMENTS OF THE INVENTION

Embodiments of the present invention are described with reference to the attached drawings.

First Embodiment

As illustrated in FIG. 1, a curved spring 1 according to the first embodiment has, as a whole, a substantially symmetrical crescent moon shape or a deformed fan shape. The curved spring 1 includes one end part 2 having a substantially wedge shape on the left side of FIG. 1 and another end part 3 also having a substantially wedge shape on the right side of FIG. 1.

FIG. 1 illustrates a load-less state of the curved spring 1 in which no load is applied to the curved spring 1. In FIG. 1, the left/right direction corresponds to an approaching/separating direction S between the one end part 2 and the other end part 3, the upper/lower direction corresponds to a width direction W orthogonal to the approaching/separating direction S, the front/rear direction of the drawing corresponds to a thickness direction T. For the sake of convenience, the direction heading from a rear side of the drawing to a front side of the drawings is assumed to be the positive of the thickness direction T.

The curved spring 1 according to the first embodiment is configured to generate an urging force in a separating direction in which the one end part 2 and the other end part 3 are separated from each other based on approach-displacement in a relative approaching/separating direction S between the one end part 2 and the other end part 3.

The curved spring 1 includes multiple beams (in this embodiment, 4-7 beam parts) that form a projecting curved surface in an upper direction of FIG. 1 between the one end part 2 and the other end part 3 and are elongated in an extending direction. The four beam parts 4-7 are arranged from an outer curve to an inner curve relative to the width direction W (which is orthogonal to the approaching/separating direction S). Among the combinations of adjacent beam parts 4-7, at least one combination of beams includes an outer curve beam part having a width W that is greater than a width W of an inner curve beam part, and the length of the outer curve beam part in the approaching/separating direction S is shorter than the length of the inner curve beam part in the approaching/separating direction S.

According to the curved spring 1 in this embodiment, three combinations of adjacent beam parts establish such relationship with each other. More specifically, as illustrated in FIG. 1, a relationship of "W4>W5>W6>W7" is satisfied in a case where "W4" indicates the width of the beam part 4 (positioned as an outermost curve) in the width direction W, "W5" indicates the width of the beam part 5 (positioned second from the outermost curve) in the width direction W, "W6" indicates the width of the beam part 6 (positioned third from the outermost curve) in the width direction W, and "W7" indicates the width of the beam part 7 (positioned as an innermost curve) in the width direction W.

Likewise, as illustrated in FIG. 1, a relationship of "L4>L5>L6>L7" is satisfied in a case where "L4" indicates the length of the beam part 4 in the approaching/separating direction S, "L5" indicates the length of the beam part 5 in the approaching/separating direction S, "L6" indicates the length of the beam part 6 in the approaching/separating direction S, and "L7" indicates the length of the beam part 7 in the approaching/separating direction. It is to be noted that the length L4 of the beam part 4 in the approaching/separating direction S is the distance from an intersection point between an inner contour line of the beam part 4 and a boundary line LE of the other end part 3 (indicated with a broken line) to an intersection point between the inner contour line of the beam part 4 and a boundary line RE of the other end part 3 as illustrated in FIG. 1.

It is to be noted that all of the beam parts 4-7 do not need to have different widths W, and a portion of the beam parts may be configured to have equal width. The length of a comparison target is defined as the length of the inner contour line in the separating/contacting direction S because the valid length of a beam is equivalent to a separating distance of both ends in the separating/loading direction.

Similarly, each of the lengths L5-L7 of the beam parts 5-7 in FIG. 1 is the distance from an intersection point between an inner contour line of each of the beam parts 5-7 and the boundary line LE of the other end part 3 (indicated with a broken line) to an intersection point between an inner contour line of each of the beam parts 5-7 and the boundary line RE of the other end part 3.

As illustrated in FIG. 1, in a case where the widths W4-W7 of each center relative to the approaching/separating direction S (i.e., each center relative to the right/left direction) is assumed as "W4C-W7C" and the widths W4-W7 of each location separated a predetermined distance (on the right or left) from the center relative to the approaching/separating direction S is assumed as "W4O-W7O", each center relative to the approaching/separating direction S and each location separated a predetermined distance from the center satisfy the above-described relationship in the width direction. That is, a relationship of "W4C>W5C>W6C>W7C" and a relationship of "W4O>W5O>W6O>W7O" are satisfied.

Further, the one end part 2, the other end part 3, and the four beam parts 4-7 of the curved spring 1 of the first embodiment are formed of a synthetic resin and integrally molded on a shared plane that is orthogonal to the thickness direction T.

In addition, in all of the beam parts 4-7 of the curved spring 1 of the first embodiment, one point located in its extending direction has a width in a width direction that is narrower than a width of another point located farther from the center relative to the approaching/separating direction S than the one point.

The widths W4-W7 of each center of the beam parts 4-7 relative to the approaching/separating direction S (being indicated as "W4C-W7C" in FIG. 1) and the widths W4-W7 of each location of the beam parts 4-7 separated a predetermined distance from the center (being indicated as "W4O-W7O" in FIG. 1) satisfy a relationship of "W4O>W4C", "W5O>W5C", "W6O>W6C", and "W7O>W7C", respectively.

Because the beam parts 4-7 of the curved spring 1 of the first embodiment are arranged in the width direction W, three crescent moon-shaped space parts are formed in-between adjacent beam parts 4-7.

In each of the space parts, one point located in its extending direction has a width in a width direction that is narrower than a width of another point located farther from the center relative to the approaching/separating direction S than the one point.

The widths of each center of the space parts relative to the approaching/separating direction S (being indicated as "D4C-D6C" in FIG. 1) and the widths of each location of the space parts separated a predetermined distance from the center (being indicated as "D4O-D6O" in FIG. 1) satisfy a relationship of "D4O<D4C", "D5O<D5C", and "D6O<D6C", respectively.

The one end part 2 of the curved spring 1 of the first embodiment includes one shaft receiving part 2*a* which is shaped as a hole enabling the one end part 2 to rotate about one axis line extending in the thickness direction T (i.e. direction orthogonal to the above-described shared plane), and the other end part 3 of the curved spring 1 of the first embodiment includes another shaft receiving part 3*a* which is shaped as a hole enabling the other end part 3 to rotate about another axis line extending in the thickness direction T (i.e. direction orthogonal to the above-described shared plane).

Further, the one end part 2 of the curved spring 1 of the first embodiment includes one communication part 2*b* establishing communication between the one shaft receiving part 2*a* and the four beam parts 4-7 on the one end side, and the other end part 3 of the curved spring 1 of the first embodiment includes another communication part 3*b* establishing communication between the other shaft receiving part 3*a* and the four beam parts 4-7 on the other end side.

An outer contour line of the outer curve of the one end 2 constitutes a line extending from an outer contour line of the beam part 4. The boundary line LE (to which the beam parts 4-7 are connected on the one end side) constitutes a straight line inclined (from bottom to top of FIG. 1) in a direction toward the center relative to the approaching/separating direction S.

An outer contour line of the outer curve of the other end 3 constitutes a line extending from an outer contour line of the beam part 4. The boundary line RE (to which the beam parts 4-7 are connected on the other end side) constitutes a straight line inclined (from bottom to top of FIG. 1) in a direction toward the center relative to the approaching/separating direction S. It is to be noted that, although the boundary line LE and the boundary line RE are referred to as boundary lines because FIG. 1 is viewed from the thickness direction T, each of the boundary line LE and the boundary line RE may constitute a boundary plane when viewed from a direction in which the boundary line LE and the boundary line RE are inclined relative to the thickness direction.

Figure 2A:
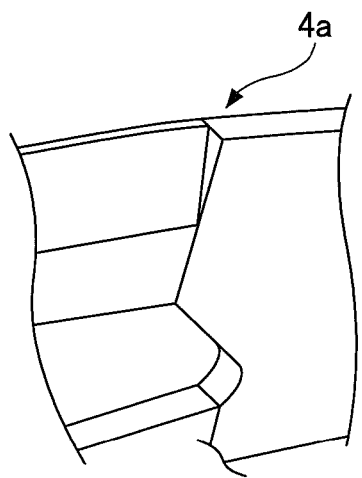
FIG. 2A is a diagram for describing an adjustment part provided in the curved spring of the first embodiment and illustrates a partial enlarged view of a configuration in which a cut surface is formed as the adjustment part.
Figure 2B:
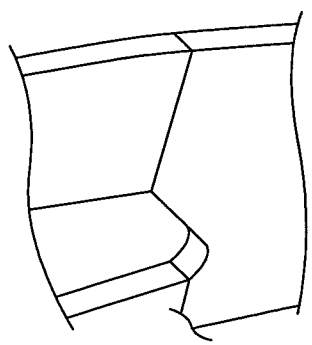
FIG. 2B is a diagram for describing the adjustment part provided in the curved spring of the first embodiment and illustrates a partial enlarged view of a configuration in which no cut surface is formed in the adjustment part.
Figure 2C:
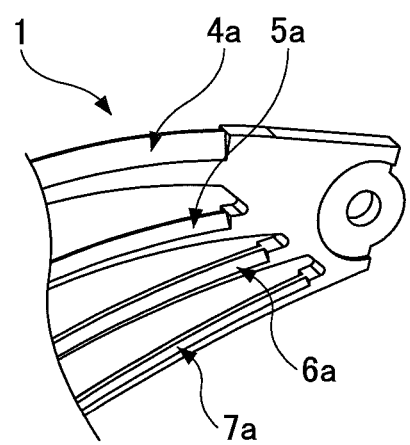
FIG. 2C is a diagram for describing the adjustment part provided in the curved spring of the first embodiment and illustrates a partial enlarged view of a configuration in which the adjustment part including a cut surface is provided in all beams.

Further, in the curved spring 1 of the first embodiment of FIG. 1, the beam part 4, which is positioned on the outermost curve among the beam parts 4-7, includes an adjustment part 4*a* that adjusts thickness of the thickness direction T (i.e. front/rear direction of the shared plane on the outer curve side). The adjustment part 4*a* is formed having a cut surface as illustrated in FIG. 2A. In other words, the adjustment part 4*a* as illustrated in FIG. 2A is formed by providing a cut surface having a tapered shape that reduces thickness on the outer curve of an outer curve part of the beam part 4 as illustrated in FIG. 2B. Although FIG. 2 illustrates an embodiment where the adjustment part 4*a* is only included in the beam part 4 of the outer curve side, adjustment parts 4*a*-7*a* may be provided in all of the beam parts 4-7 as illustrated in FIG. 2C. Alternatively, the adjustment part may be mounted on a given single beam part or a given combination of beam parts.

The relationship of the widths of adjacent beam parts of the curved spring 1, the relationship of the lengths in the extending direction of the beam parts of the curved spring 1, the relationship of the widths of two different points in the extending direction of the beam parts of the curved spring 1, and the configuration of the communication parts 2*b*, 3*b* are based on the below-described technical concept.

As illustrated in the top row of FIG. 3, the number of beam parts arranged in the width direction W, the width of the beam parts, and the configuration of the communication parts 2*b*, 3*b* are parameters that affect the main characteristics (load, stress, and "shift" in the thickness direction) of the curved spring 1 having a flat shape as a whole.

It is to be noted that "shift" refers to a phenomenon in which the shared plane including the one end part 2 and the other end part 3 (particularly, a center vicinity portion of the beam parts 3-7 in the approaching/separating direction S) is displaced with respect to the thickness direction T in a case where the curved spring 1 is caused to deform (project) toward the outer curve by application of a load that forces the one end part 2 and the other end part 3 of the curved spring 1 to approach toward each other.

In adjusting the load characteristics, it is effective to adjust the number of beam parts, the width of the beam part, the degree of thickening the communication parts 2*b*, 3*b* (i.e. shape of root parts), the thickness, the length, and the appropriate placement of the adjustment part 4*a* as illustrated in the leftmost column "load adjustment" in FIG. 3. It is to be noted that, in FIG. 3, "↑" indicates increase and "↓" indicates decrease or reduction.

More specifically, in order to increase the load with respect to same displacement or strain, it is effective to increase the number of beam parts, increase the width of the beam part(s), thicken the root part in the uniform surface, increase the thickness of the beam parts 4-7 or the communication parts 2, 3, reduce (shorten) the length of the beam parts 4-7 in the approaching/separating direction S. It is to be noted that unnecessary thickness is to be eliminated, ease of manufacture is to be improved, and the amount of synthetic resin used is to be reduced as much as possible by appropriately placing the adjustment part 4a at a part where load increase is not required.

In adjusting the stress characteristics, stress can be reduced by reducing the width of the beam part as illustrated in the column "stress adjustment" in FIG. 3. By adjusting the ratio of width between two points that are provided at different points in the width direction of the same beam part or the balance of width, stress can be made uniform. By increasing the length of the beam part, the amount of stress generated at respective parts of the curved spring 1 can be reduced.

In taking countermeasures against shift in the width direction T, it is effective to positively cause bending toward the outer curve side of the shared plane with respect to load applied in the approaching/separating direction and to increase rigidity for maintaining the curved spring 1 in the shared plane by reducing the width of the beam parts 4-7, thickening the root shape, and thickening the fastening part (i.e. thickening the vicinity of the one shaft receiving part 2a and the other shaft receiving part 3a in the shared plane (XY plane direction)).

By molding the synthetic resin into a uniform body, the curved spring 1 of the first embodiment can attain the above-described relationship between the widths of the adjacent beam parts, the above-described length of the adjacent beam parts in the their extending direction, the above-described relationship between the widths of different points of the same beam part, and the above-described configuration desired for the communication parts 2b, 3b.

The curved spring 1 of the first embodiment is configured having the wedge-like one end part 2 on the left side and the wedge-like other end part 3 on the right side when viewed from a direction inclining toward both the approaching/separating direction S and the width direction W, and the three space parts arranged in the width direction by connecting the four beam parts 4-7 (including the one and other end parts 2, 3 arranged in their width direction and having arcs of different curvatures in the shared plane) in the left/right direction.

Figure 4:
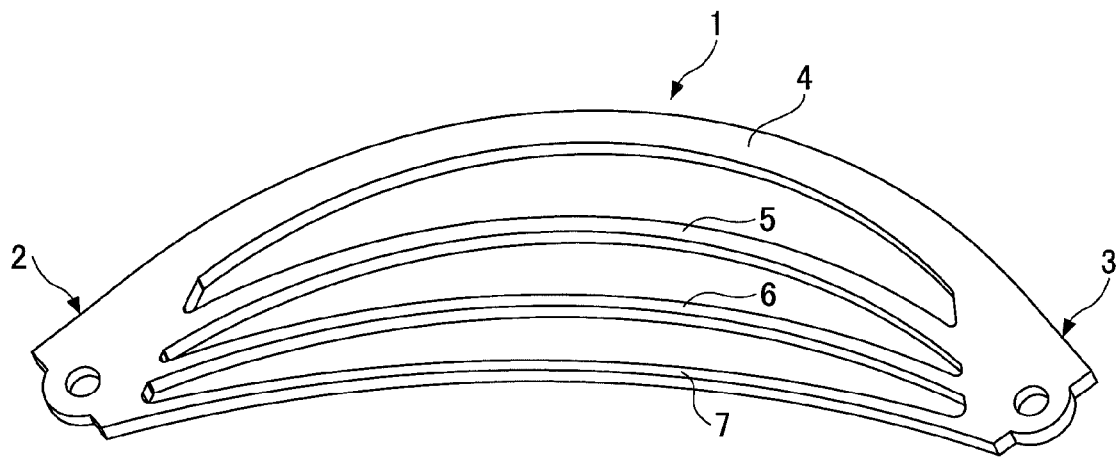
FIG. 4 is a perspective view of the curved spring of the first embodiment.
Figure 5:
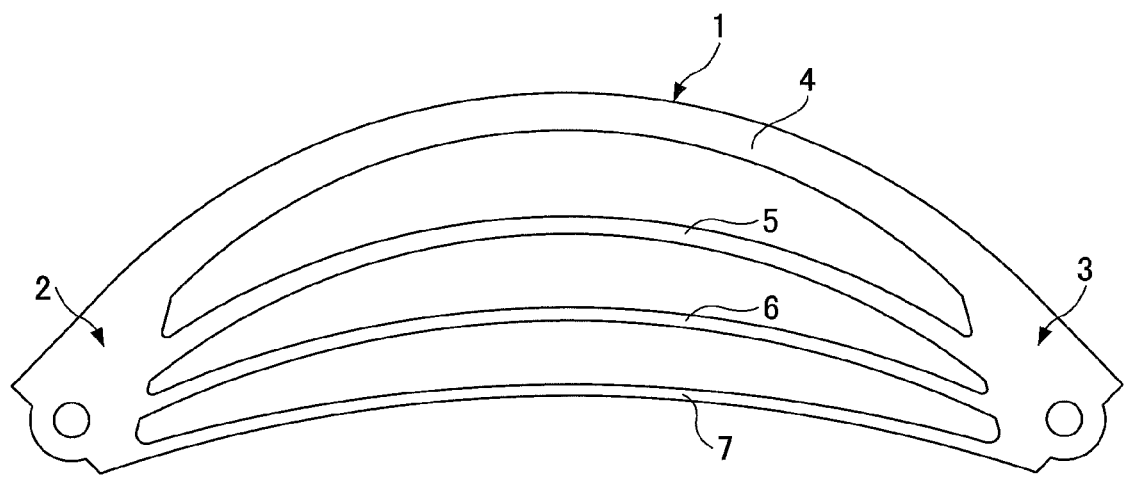
FIG. 5 is a plan view of the curved spring of the first embodiment.

The curved spring 1 of FIG. 4 constitutes a configuration illustrated in FIG. 5 when viewed from the thickness direction T. As shown in the configuration, the density of the arrangement of the synthetic resin becomes dense to sparse from the outer side to the inner side in the left/right direction of FIG. 5 (in contrast, the occupancy of the space parts becomes sparse to dense from the outer side to the inner side) in correspondence with the above-described relationship between the widths of the beam parts 4-7, the above-described relationship between the points within the beam part, and the above-described configuration of the communication parts 2b, 3b.

Accordingly, the effect of preventing "shift" can be increased by substantially concentrating the deformation generated during application of load to the vicinity of the center relative to the approaching/separating direction S.

Figure 6A:
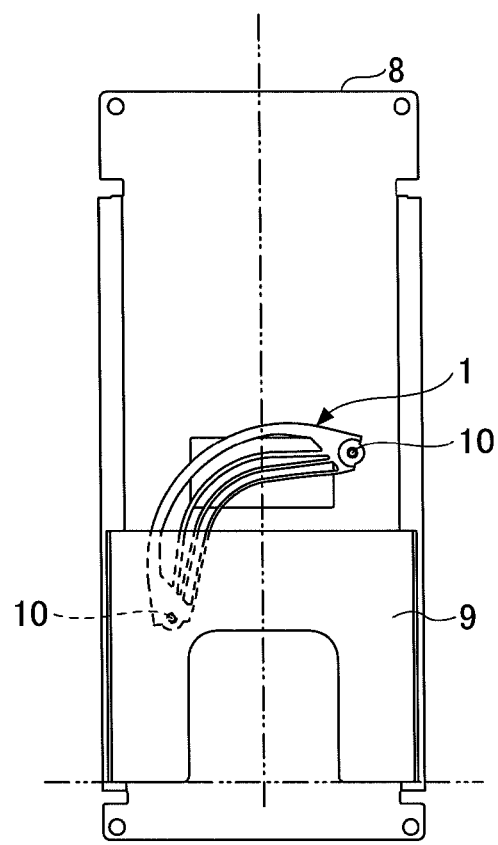
FIG. 6A is a plan view of a closed state of a slide mechanism having a base plate and a slide plate attached to the curved spring of the first embodiment.
Figure 6B:
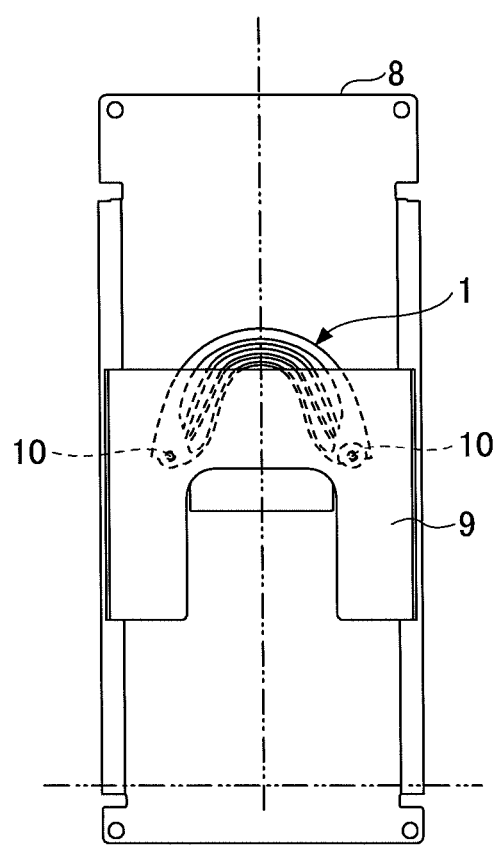
FIG. 6B is a plan view illustrating a neutral state of the slide mechanism having the base plate and the slide plate attached to the curved spring of the first embodiment.
Figure 6C:
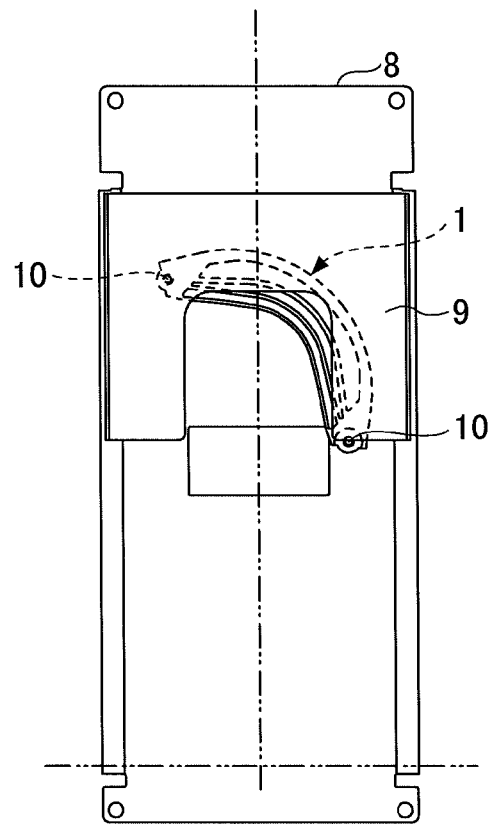
FIG. 6C is a plan view illustrating a open state of the slide mechanism having the base plate and the slide plate attached to the curved spring of the first embodiment.

It is preferable to use the curved spring 1 of the first embodiment for the below-described slide mechanism. As illustrated in FIGS. 6A-6C, the slide mechanism using the resin spring 1 of the first embodiment includes a base plate (substrate) 8, s slide plate 9, and a pin 10 for attachment to the resin spring 1. The base plate 8 is a rectangular flat member and is formed of, for example, stainless steel. Rails are formed at the end parts of the long sides of the base plate 8 (extending in an up/down direction of FIGS. 6A-6C on both sides of the base plate 8).

The slide plate 9 has a short length compared to the base plate 8 with respect to its sliding direction, that is, the up/down direction of FIGS. 6A-6C (long side direction of the base plate 8). The slide plate 9 also has a rectangular flat shape. Bent parts are formed on the end parts of the slide plate 9 in the left/right directions of FIGS. 6A-6C in a manner extending toward the rear of FIGS. 6A-6C in mid-course and then extending inward in the width direction. A concave space, which extends in the sliding direction and is open inward in the width direction, is formed by the bent parts. Guides (not illustrated) are mounted to the concave space by attaching the outer side surfaces of the guides to the concave space.

The guide is formed of, for example, fluorine resin for improving the sliding property with respect to the above-described rails. Groove parts are formed in the surfaces facing a pair of the guides. The groove parts are slidably engaged to the rails of the base plate 8.

By engaging the guides to the rails, the slide plate 9 is slidable with respect to the base plate 8 in the up/down direction of the FIGS. 6A-6C. For example, in the one shaft receiving part 2a and the other shaft receiving part 3a of the curved spring 1 of the first embodiment, the one shaft receiving part 2a is rotatably connected to the slide plate 9 by a pin 10 whereas the other shaft receiving part 3a is rotatably connected to the base plate 9 by a pin 10.

FIG. 6A illustrates a closed position of the slide plate 9 in which the slide plate 9 is positioned at a lowermost position in FIG. 6 with respect to the base plate 8. FIG. 6C illustrates an open position of the slide plate 9 in which the slide plate 9 is positioned at an uppermost direction with respect to the base plate 8. FIG. 6B illustrates a neutral position of the slide plate 9 in which the slide plate 9 is in a middle of moving from the closed position to the open position.

Figure 7A:
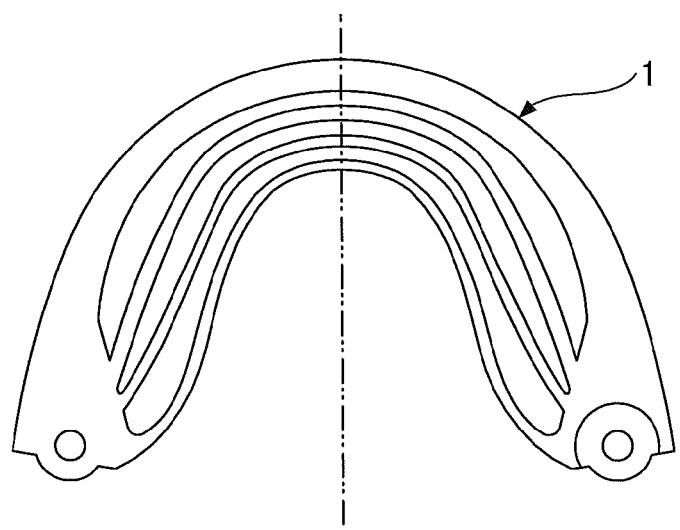
FIG. 7A is a plan view illustrating a most-bent state of the curved spring of the first embodiment.
Figure 7B:
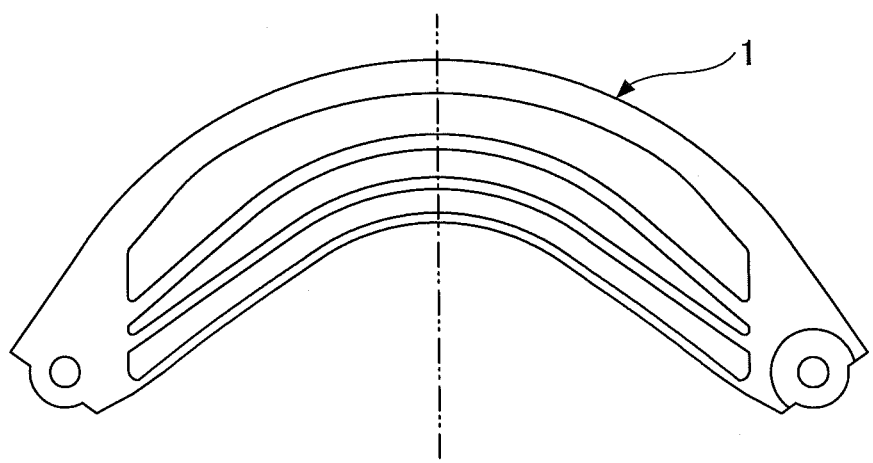
FIG. 7B is a plan view illustrating a neutral state of the curved spring of the first embodiment.
Figure 7C:
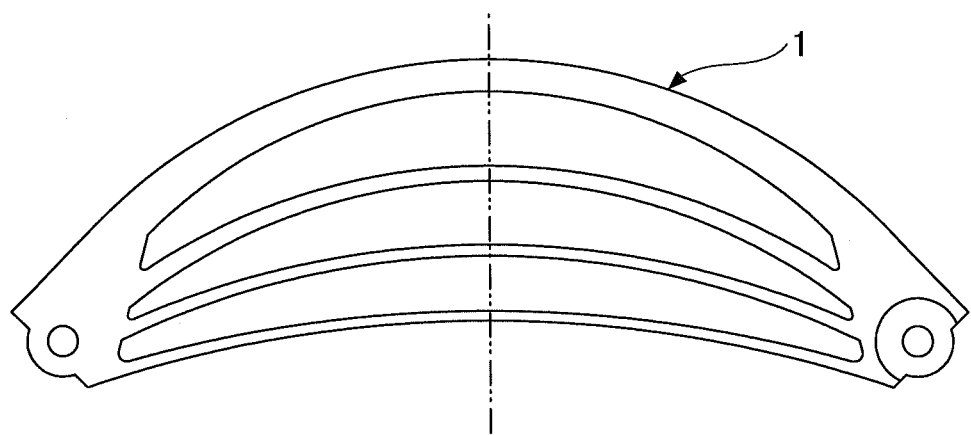
FIG. 7C is a plan view illustrating a load-less state of the curved spring of the first embodiment.

In a case where the curved spring 1 is in load-less state (a state having no load applied thereto) as illustrated in FIG. 7C, the curved spring 1 has the same configuration as those of FIGS. 1 and 5. The curved spring 1 is assembled to the slide apparatus by way of the pin 10. Further, in a state where the curved spring 1 is in the closed position of FIG. 6A or the open position of FIG. 6C, the widths D4C-D6C of the center of the space parts relative to the approaching/separating direction S are mainly reduced. Particularly, the curved spring 1 is bent (deformed) until the widths of the space parts become substantially uniform in their extending direction.

The curved spring 1 is further bent (deformed) from the state illustrated in FIG. 7B to a most-bent state illustrated in FIG. 7A when the slide plate 9 is displaced from the closed position of FIG. 6A or the open position of FIG. 6C to the neutral position of FIG. 6B. In the most-bent state, the width of the center of the space part relative to the approaching/separating direction S becomes narrower than the width of a part separated from the center. However, even in this most-bent state, the width of the space part does not become zero, and the width of the space part in the load-less state of FIG. 7C and the elastic coefficient of the curved spring 1 itself are set in order to prevent interference among the adjacent beam parts.

With the curved spring 1 and the slide mechanism of the above-described first embodiment, the following effects can be attained. Because the slide plate 9 and the base plate 8 are connected to the curved spring 1 being molded into a united body by a synthetic resin and having a crescent moon shape, even in a case of transferring to the open state, the closed state, or the neutral state illustrated in FIGS. 6A-6C, the curved spring 1 of the first embodiment can effectively avoid the above-described "shifting". Because the curved spring 1 curves and resiliently deforms only in an initially set shared plane, the slide mechanism or the components inside the electronic device using the slide mechanism can be prevented from interfering with each other.

Because the curved spring 1 itself is formed of a synthetic resin and has a small amount of rigidity, even where interference with other components of the electronic device is caused due to displacement in the thickness direction T of the curved spring 1 by unexpected external force applied from outside the electronic device, the curved spring 1 can be prevented from affecting the other components. Therefore, the degree of freedom of arranging the curved spring 1 can be improved.

Further, because the curved spring 1 itself is formed of a synthetic resin, even in a case where, for example, an insulating property is required for the base plate 8 and the slide plate 9, no additional insulating component is required. Thus, the number of components as well as manufacturing cost can be reduced.

Particularly, compared to the conventional torsion spring, interference with other components can be reduced because the curved spring 1 of this embodiment can be formed having a reduced thickness (thickness direction T). In sliding the slide plate 9, an inner space (which is provided in anticipation of displacement and curving of the curved spring 1) can have its thickness reduced. Accordingly, the dimension of the slide mechanism and the electronic device can be reduced in the thickness direction T. Therefore, slide mechanism and electronic device can be mounted with higher density.

Further, compared to forming multiple beam parts and space parts therebetween by performing press-molding on a metal planar member, the degree of freedom for setting the relationship of the widths between the adjacent beam parts, the widths of the beam part, the thicknesses of the one and the other end parts, and the widths of the space parts can be improved because the curved spring 1 of the first embodiment is formed by performing integral molding on a synthetic resin. Accordingly, designing cost and manufacturing cost of the curved spring 1 can be reduced, and productivity of the curved spring 1 can be improved.

In addition, compared to a spring formed by performing press-molding on a metal planar member, it is easier to attain a necessary rigidity of the curved spring 1, prevent stress from concentrating on a particular portion (attain a uniform stress distribution), and prevent "shifting" with the curved spring 1. Accordingly, balance of design and manufacture can be achieved without sacrificing the performance/endurance of the spring or the endurance of the slide mechanism.

Particularly, in a case where change of design is needed (e.g., change of load), it can be handled by making a minor change (e.g., changing the number of beam parts 4-7 arranged in the width direction, the relationship of the widths of the beam parts 4-7) in the curved spring 1 of the first embodiment.

According to the above-described slide mechanism of the first embodiment, the up/down direction of FIGS. 6A-6C is assumed as the direction of the long side of the base plate 8. However, in a case where the length of the sliding direction of the base plate 8 is shorter than the length of the left/right direction, the up/down direction of FIGS. 6A-6C may be assumed as the direction of the short side of the base plate 8.

The curved spring 1 of the above-described first embodiment includes four beam parts 4-7. Alternatively, the curved spring 1 may be configured having two or three beam parts. Alternatively, the curved spring 1 may be configured having five or more beam parts. The number of beam parts may be discretionally set. Particularly, in a case of changing load, slight adjustments (e.g., design change in an order starting from an inner side beam part having a small amount of thickness) can be easily made.

The configuration of the boundary lines LE, RE of the one and the other end parts 2, 3 of the curved spring 1 of the first embodiment is not limited to the above-described inclined straight line. For example, the boundary lines may be configured to form a step-like shape in correspondence with each beam part. The length of each beam part in the approaching/separating direction S may be set based on the inner contour line on the inner side of beam part. Alternatively, the length of each beam part in the approaching/separating direction S may be set based on the center of the width direction relative to the extending direction of the beam part or the outer contour line on the outer side of the beam part.

With the above-described first embodiment, all of the beam parts constituting the curved spring 1 are formed by performing integral molding on a synthetic resin. Alternatively, a portion of the beam parts may be formed by a metal material.

Second Embodiment

Figure 8A:
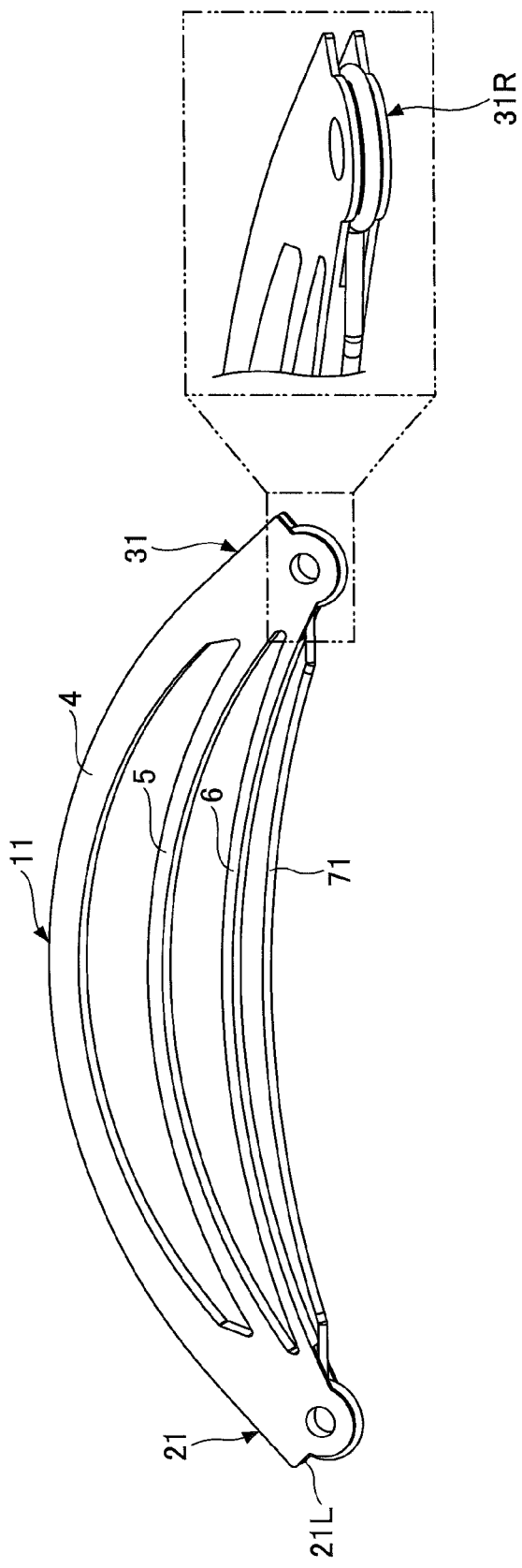
FIG. 8A is a perspective view illustrating a curved spring of a second embodiment.
Figure 8B:
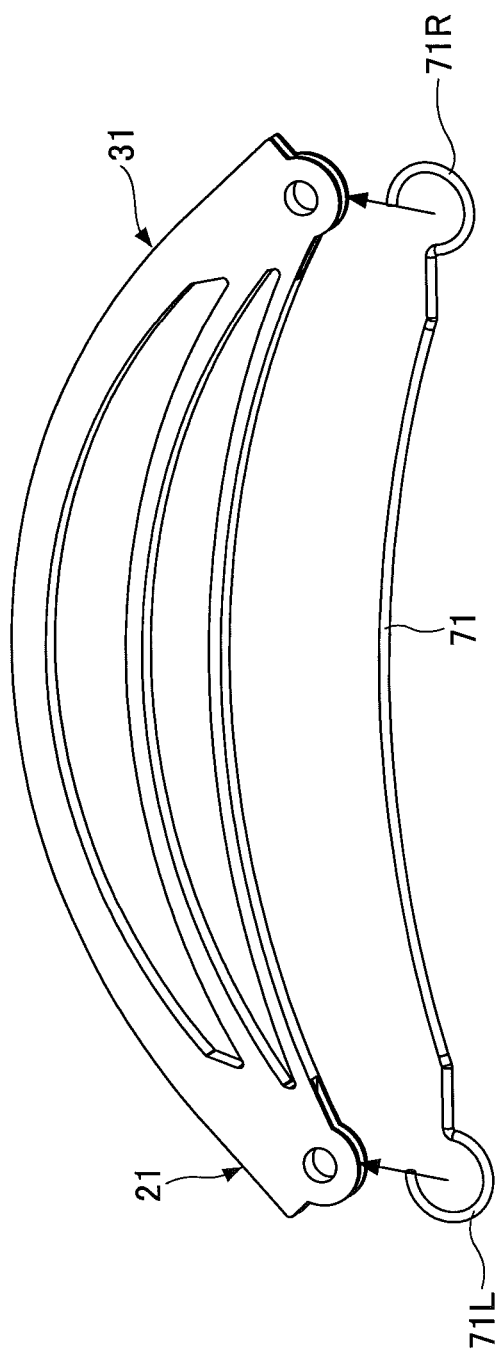
FIG. 8B is an exploded perspective view illustrating the curved spring of the second embodiment.

The curved spring 11 of the second embodiment illustrated in FIGS. 8A and 8B has the innermost beam part 7 of the curved spring 11 of the first embodiment replaced with a beam part 71 formed of a metal material. The metal beam part 71 (configuration having the beam part 7 removed from the curved spring 11 of the first embodiment of FIG. 1) can be attached to an integrally molded main body part of the spring by providing an attachment groove in the lower sides of a one end part and another end part illustrated in FIG. 8.

That is, a curl part 71L and a curl part 71R are formed on both end parts (in the approaching/separating direction) of the metal beam part 71. The curl part 71L and the curl part 71R include a portion constituting an arcuate shape of 180 degrees or more (in this embodiment, approximately 270 degrees). Groove parts 21L, 31R, which are attachable to the curl parts 71L, 71R from the lower side of FIGS. 8A, 8B, are formed in a one end part 21 and the other end part 31 of the curved spring 11.

Figure 9B:
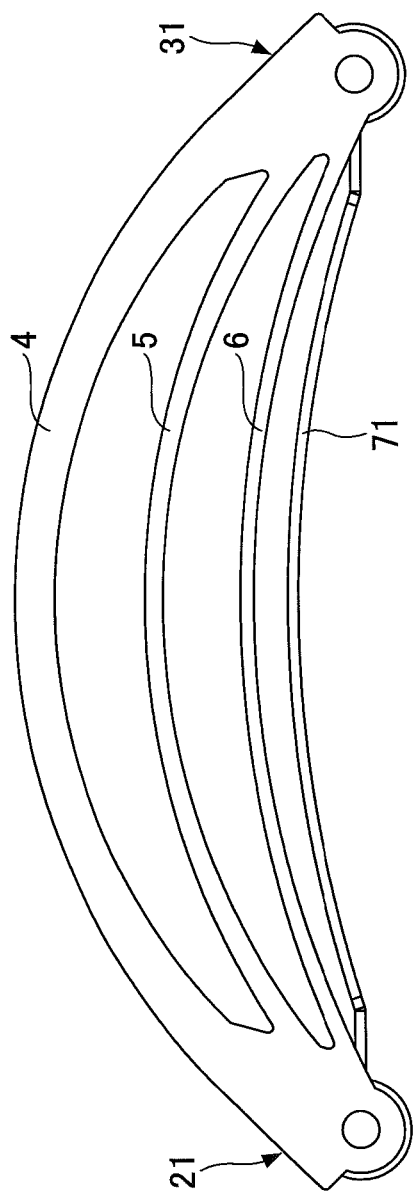
FIG. 9B is a plan view of the curved spring of the second embodiment.
Figure 9C:
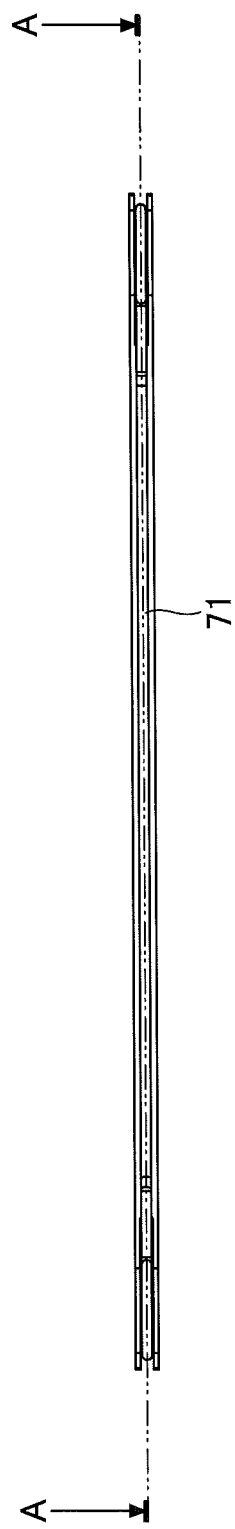
FIG. 9C is a front view of the curved spring of the second embodiment.

FIG. 9A is a horizontal cross-sectional view (cross-sectional view along line A-A of FIG. 9C) of the curved spring 11. FIG. 9B is a plan view of the curved spring 11. FIG. 9C is a front view of the curved spring 11. In a case of integrally molding the beam parts 4-6, the one end part 21, and the other end part 31, the groove parts 21L, 31R are molded having a middle portion for installing the curl parts 71L, 71R therein as illustrated in FIGS. 9A-9C.

Similar to the curved spring 1 of the first embodiment, the curved spring 11 of the second embodiment can also improve degree of freedom for designing and manufacturing, improve performance, and improve endurance. Further, in a case where resiliency is desired to be set to two steps, the curved spring 11 of the second embodiment can utilize the metal beam part 71 for adjusting resiliency to two steps. In a case where there is a significant difference between the resiliencies of the two steps, the degree of freedom can be improved compared to only performing integral molding on a resin material.

Because the curved spring 11 of the second embodiment is configured having the innermost beam part formed of a metal material and engaged to the groove parts 21L, 31R formed on an outer peripheral surface of the one and the other end parts 21, 31, the effective function of insulating the base plate 8 and the slide plate 9 of the curved spring 1 of the first embodiment can be maintained.

Further, because the outer side beam part (which tends to interfere with other components) is formed of a resin material whereas the inner side beam part 71 is formed of a metal material, the rigidity of the shared plane (plane rigidity) can be increased. Thereby, the function of preventing interference can be improved.

In the above-described first and second embodiments, integral molding with a resin material is performed one time on a portion to which the integral molding is to be performed. Alternatively, as described below in a third embodiment, one end part and another end part may be provided in correspondence with each beam part arranged in the width direction and engaged to the corresponding beam part when installing a curved spring in a slide mechanism.

Third Embodiment

Figure 10A:
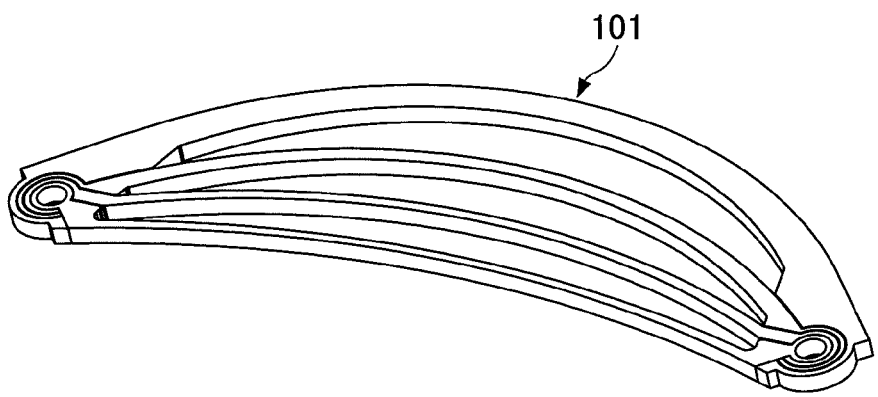
FIG. 10A is a perspective view of a curved spring of a third embodiment.
Figure 10B:
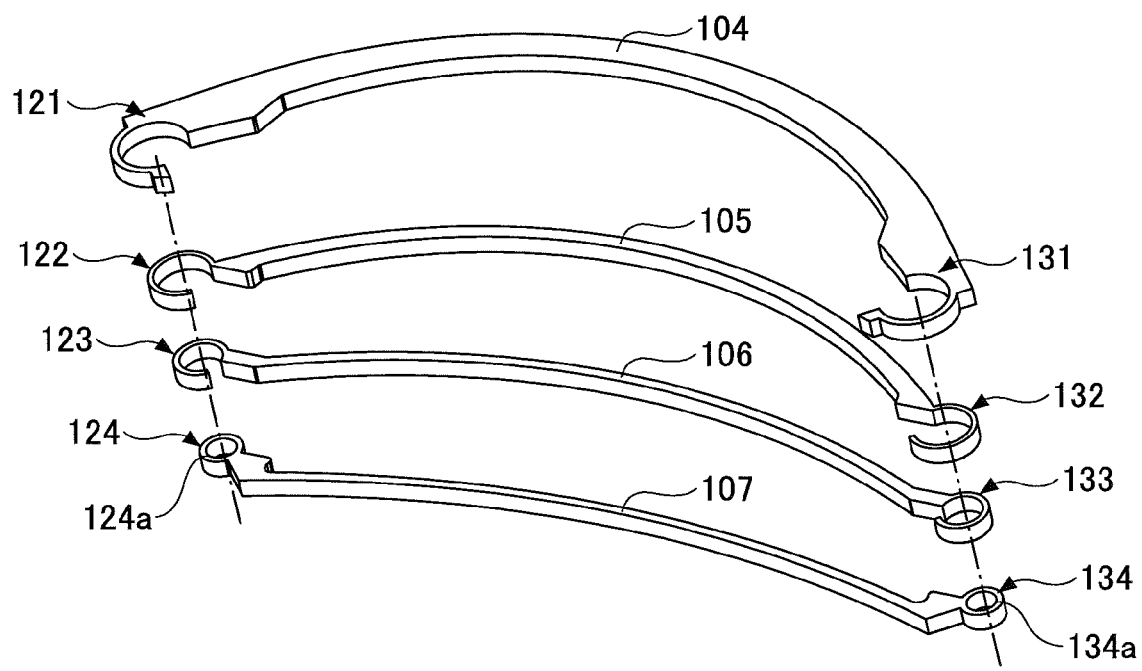
FIG. 10B is an exploded perspective view of the curved spring of the third embodiment.

As illustrated in FIG. 10, a curved spring 101 of the third embodiment includes beam parts 104-107, one independent end parts 121-124 and other independent end parts 131-134 corresponding to each of the beam parts 104-107. The one independent end part 124 includes one shaft receiving part 124a having a hole shape. The other independent end part 134 includes another shaft receiving part 134a having a hole shape.

That is, the one end part of the curved spring 101 has the one independent end parts 121-124 communicating with each of the four beam parts 104-107 by way of the one shaft receiving part 124a and the other independent end parts 131-134 communicating with each of the four beam parts 104-107 by way of the other shaft receiving part 134a.

In addition, the one independent end parts 121-124 are configured to be layered on top of each other in a radial direction of the one shaft receiving part 124a, and the other independent end parts 131-134 are configured to be layered on top of each other in a radial direction of the other shaft receiving part 134a.

The curved spring 101 of the third embodiment can attain the same effects as those of the curved spring 1 of the first embodiment. In addition, in a case where, for example, two, three, or four levels of rigidity is desired, a target beam part can be selected and engaged with another beam part step by step after setting the rigidity and resiliency of each beam part 104-107. Thereby, a desired rigidity can be attained without having to change design.

It is to be noted that the present invention is not limited to the above-described embodiments, but variations and modifications may be made without departing from the scope of the present invention.

The present international application is based on Japanese Patent Application No. 2010-175722 filed on Aug. 4, 2010, the entire contents of which are incorporated herein by reference.

The invention claimed is:

1. A curved spring comprising:
one end part and another end part configured to approach and separate relative to each other in an approaching/separating direction; and
a plurality of beam parts that bend between the one end part and the other end part and extend in an extending direction, the plural beam parts being arranged in a width direction orthogonal to the approaching/separating direction;
wherein at least one combination of adjacent beam parts among combinations of the plural beam parts includes an outer side beam part having a width that is greater than a width of an inner side beam part in the width direction,
wherein the outer side beam part has a length that is less than a length of the inner side beam part in the approaching/separating direction,
wherein the one and the other end parts and at least one beam part of the plural beam parts are integrally molded on a shared plane by a synthetic resin,
wherein a space part extending from the one end part to the other end part is provided between each of the plurality of beam parts.

2. The curved spring as claimed in claim 1,
wherein at least one beam part of the plural beam parts includes one part in the extending direction having a width in the width direction that is greater than a width of another part located farther from a center than the one part in the approaching/separating direction.

3. The curved spring as claimed in claim 1,
wherein the one end part includes a one shaft receiving part that can rotate the one end part about one axis line orthogonal to the shared plane,
wherein the other end part includes another shaft receiving part that can rotate the other end part about another axis line orthogonal to the shared plane.

4. The curved spring as claimed in claim 3,
wherein the one end part includes a one communication part establishing communication between the one shaft receiving part and the plural beam parts on one end side,
wherein the other end part includes another communication part establishing communication between the other shaft receiving part and the plural beam parts on another end side.

5. The curved spring as claimed in claim 1,
wherein one beam part of the plural beam parts includes an adjustment part that adjusts a thickness of the outer side in a front/rear direction of the shared plane.

6. The curved spring as claimed in claim 1,
wherein all of the plural beam parts are molded by a synthetic resin.

7. The curved spring as claimed in claim 1,
wherein at least one beam part of the plural beam parts is formed of metal.

8. The curved spring as claimed in claim 3,
wherein the one end part includes a plurality of one independent end communication parts that establish communication between each of the plural beam parts and the one shaft receiving part,
wherein the other end part includes a plurality of other independent end communication parts that establish communication between each of the plural beam parts and the other shaft receiving part,
wherein the plural one independent end communication parts are configured to be layered in a radial direction of the one shaft receiving part,
wherein the plural other independent end communication parts are configured to be layered in a radial direction of the other shaft receiving part.

9. A slide mechanism comprising:
the curved spring as claimed in claim 3;
a substrate; and a slide plate that is slidably connected to the substrate in a predetermined direction;
wherein the one shaft receiving part of the curved spring is rotatably connected to the substrate,
wherein the other shaft receiving part of the curved spring is rotatably connected to the slide plate.

* * * * *